(12) United States Patent
Zhang (10) Patent No.: US 11,534,269 B2
(45) Date of Patent: Dec. 27, 2022

(54) MOUNTING DEVICE FOR DIRECTLY BONDING BRACKETS TO THE TOOTH SURFACE

(71) Applicant: Zhengpu Zhang, Hangzhou (CN)

(72) Inventor: Zhengpu Zhang, Hangzhou (CN)

( * ) Notice: Subject to any disclaimer, the term of this patent is extended or adjusted under 35 U.S.C. 154(b) by 77 days.

(21) Appl. No.: 16/747,537

(22) Filed: Jan. 21, 2020

(65) Prior Publication Data

US 2020/0146779 A1 May 14, 2020

Related U.S. Application Data

(63) Continuation of application No. PCT/CN2019/100936, filed on Aug. 16, 2019.

(30) Foreign Application Priority Data

Jul. 30, 2019 (CN) .......................... 201910694280.3

(51) Int. Cl.
*A61C 7/14* (2006.01)
(52) U.S. Cl.
CPC .................................... *A61C 7/146* (2013.01)
(58) Field of Classification Search
CPC ............ A61C 7/14; A61C 7/145; A61C 7/146
USPC .............................................................. 433/3
See application file for complete search history.

(56) References Cited

U.S. PATENT DOCUMENTS

| 10,052,177 | B2 * | 8/2018 | Andreiko | ................ | A61C 7/146 |
| 2010/0190125 | A1 * | 7/2010 | Lee | ........................ | A61C 7/146 |
| | | | | | 433/3 |
| 2010/0216083 | A1 * | 8/2010 | Grobbee | ................. | A61C 7/146 |
| | | | | | 433/3 |
| 2014/0255864 | A1 * | 9/2014 | Maehata | ................. | A61C 7/146 |
| | | | | | 433/3 |
| 2016/0074139 | A1 * | 3/2016 | Maehata | ................. | A61C 7/146 |
| | | | | | 433/3 |
| 2017/0325911 | A1 * | 11/2017 | Marshall | ................. | A61C 7/146 |
| 2018/0055605 | A1 * | 3/2018 | Witte | ...................... | A61C 7/146 |
| 2018/0303583 | A1 * | 10/2018 | Tong | ....................... | A61C 7/146 |
| 2018/0344431 | A1 * | 12/2018 | Kuo | ......................... | A61C 19/04 |

FOREIGN PATENT DOCUMENTS

| CN | 106880414 A | | 6/2017 | | |
| CN | 107874849 A | | 4/2018 | | |
| FR | 2988994 A1 | * | 10/2013 | ............. | A61C 7/146 |
| WO | WO-2006025661 A1 | * | 3/2006 | ............. | A61C 7/146 |

* cited by examiner

*Primary Examiner* — Cris L. Rodriguez
*Assistant Examiner* — Drews S Folgmann
(74) *Attorney, Agent, or Firm* — Bayramoglu Law Offices LLC (57) ABSTRACT

A mounting device for directly bonding brackets to the tooth surface includes a tray and a mounting rack. Each mounting rack is used for mounting a bracket, and the mounting rack includes a support and a positioning clamp. The tray is used as the support base for installing the mounting rack. The support is used as the fixed supporting part, with one end connected and fixed to the lingual or lip side of the tray. The positioning clamp is used as the rotating part to connect with the bracket and adjust the position of the bracket. The positioning clamp includes a damping rotation shaft, the damping rotation shaft matches with the support, the positioning clamp rotates around the support through the damping rotation shaft, and the support and the tray adopt an integrally formed structure or detachable structure.

12 Claims, 9 Drawing Sheets

FIG. 13 ized bonding;

MOUNTING DEVICE FOR DIRECTLY BONDING BRACKETS TO THE TOOTH SURFACE

CROSS REFERENCE TO THE RELATED APPLICATIONS

This application is continuation application of International Application No. PCT/CN2019/100936, filed on Aug. 16, 2019, which is based upon and claims priority to Chinese Patent Application No. 201910694280.3, filed on Jul. 30, 2019, the entire contents of which are incorporated herein by reference.

TECHNICAL FIELD

This invention relates to the field of bracket bonding, and in particular to a mounting device for directly bonding brackets to the tooth surface.

BACKGROUND

At present, during the orthodontic treatment of oral teeth, the orthodontic bracket is fixed on the tooth surface, and the archwire passes through the archwire slot (also known as the square wire slot) on the bracket, and is directly ligated into the archwire slot of the bracket with a ligature rubber ring or steel wire, and the correction force of the archwire is transmitted to the tooth through the bracket, so that the tooth can move as expected to achieve the purpose of tooth correction. Therefore, there are strict requirements for the bonding position of the bracket on the tooth, because this is an important factor affecting the correction effect. There are two traditional methods to choose the bracket bonding position. One is to mark the tooth based on experience and then bond it, and the bonding effect is greatly affected by the doctor's technical level. Moreover, this method can only be performed by a professional doctor in the clinic, which brings inconvenience to patients and doctors during the process of correction. What's more, in the process of installing the brackets, the volume of the brackets is small and the operating space in the month is limited, which greatly prolongs the treatment time, brings a very poor treatment experience to patients, and wastes time.

At present, the following bonding technologies are also available:

I. Indirect Bonding Technology for Orthodontic Brackets:

At present, the positioning and bonding of orthodontic brackets mainly use the indirect bonding technology: The indirect bonding technology is to first bond the orthodontic brackets on the patient's dental mold according to the position determined by the diagnosis and treatment design plan, and transfer the brackets to the patient's mouth and bond them to the tooth surface through the guide plate and the bracket connection support. Indirect bonding requires secondary bonding and a professional dental technician to assist in the operation, and there are certain errors and separation.

Indirect bonding is roughly divided into two technologies: hard connection and soft connection:

a. Hard connection technology: The positioning guide plate and the bracket connection support are fixed, with accurate positioning, high production requirements and cost, and difficult operation;

b. Soft connection technology: The positioning guide plate has a two-layer structure, and the inner layer is the brackets covered with soft rubber, so the brackets have a function of relative free adjustment, and the brackets and the tooth surface are relatively closely bonded. The soft connection technology has disadvantages such as insufficient positioning accuracy, and high separation rate of brackets at the time of removing the guide plate.

II. Direct Bonding Technology for Orthodontic Brackets:

It is the method with which the orthodontic brackets are directly bonded on the patient's tooth surface instead of bonding on the dental mold for transfer.

a. An orthodontist bonds brackets to the tooth surface through visual measurement based on his/her experience, and the method is time consuming and has a large error, b. Determine the bracket position on the digital dental mold through the software, design and 3D print the positioning guide plate, and install the brackets into the guide plate in a full-wrapping or semi-wrapping manner to achieve positioned bonding;

This technical solution is affected by the accuracy of 3D printing and the processing accuracy of brackets, and has disadvantages such as insufficient positioning accuracy, and high separation rate of brackets at the time of removing the guide plate.

The Chinese patent CN201710993718.9 discloses a bracket bonding positioner and its manufacturing method and bracket positioning method. This technical solution has the following advantages. The computer is used to simulate the creation of the bracket bonding positioner and the matching, thereby reducing the discomfort of direct operation in the patient's mouth, optimizing the patient's treatment environment and simplifying the entire treatment process. The opening of the matching slots is simulated, so that the mounting position of the brackets can be accurately set, and it is not necessary to perform operations such as removal of dental mold and marking on the spot. During the creation of the bracket positioner, the patient only needs to provide a 3D scanning prototype of the oral teeth to the doctor to complete the preparatory work, making it possible for commercialization and pipeline production. However, during the operation, due to the large deviation in the shape and position of human teeth, manual adjustment is sometimes required. Therefore, the mounting base plate and brackets need to have a high degree of freedom to facilitate adjustment. At the same time, the entire mounting mechanism needs to satisfy the simultaneous mounting conditions.

The Chinese patent 201710108773.5 provides an indirect bonding method for target-oriented positioning of orthodontic brackets. The method uses the 3D printing technology and positioning seats to pre-design the mounting position of brackets, and then mounts brackets on the tooth surface. This method has high requirements for the accuracy of 3D printing and brackets, and it is costly during actual operation and inconvenient to operate.

SUMMARY

With respect to the complexity of indirect bonding and the high technical requirements of direct bonding in the prior art, this invention provides a mounting device for directly bonding brackets to the tooth surface.

In order to solve the above technical problems, this invention adopts the following technical solution:

A mounting device for directly bonding brackets to the tooth surface, including a tray and a mounting rack, each mounting rack is used for mounting a bracket, and the mounting rack includes a support and a positioning clamp;

The tray, which is used as the support base for installing the mounting rack;

The support, which is used as the fixed supporting part, with one end connected and fixed to the lingual or lip side of the tray;

The positioning clamp, which is used as the rotating part to connect with the bracket and adjust the position of the bracket;

The positioning clamp includes a damping rotation shaft, the damping rotation shaft matches with the support, the positioning clamp rotates around the support through the damping rotation shaft, the diameter range of the damping rotation shaft is 0.2 mm-5 mm, and the support and the tray adopt an integrally formed structure or detachable structure. With this structure, the brackets have a large degree of freedom, thus facilitating the bonding and position adjustment of the brackets.

Preferably, the positioning clamp is provided with a mounting slot for installing the damping rotation shaft. The damping rotation shaft can rotate in the mounting slot. The outer wall of the damping rotation shaft closely matches with the inner wall of the mounting slot in whole or in part. When the damping rotation shaft is rotated, the positioning clamp can suspend at the position to which the damping rotation shaft rotates. The damping rotation shaft can stay at any position under friction, which is convenient to apply glue to the brackets during the installation process, and adjust the position of the brackets, making the installation more convenient. Meanwhile, the process is easier to control.

Preferably, the support is provided with a mounting slot matching the rotation shaft, and the damping rotation shaft can rotate in the mounting slot. When the support is mounted on the tray, the outer wall of the damping rotation shaft closely matches with the inner wall of the mounting slot in whole or in part. When the damping rotation shaft is rotated, the positioning clamp can suspend at the position to which the damping rotation shaft rotates. The advantage of this method is that the size of the mounting slot can be broader. Only when the support is mounted on the tray, the support is deformed to reduce the inner diameter of the mounting slot, so that the damping rotation shaft is clamped in the mounting slot. This can provide greater help for placing the positioning clamp in the mounting slot and avoid the greater resistance in the process of rotating the damping rotation shaft into the mounting slot.

Preferably, the support is an elastic part with deformation recovery ability, and includes a first clamping plate and a second clamping plate. The ends of the first clamping plate and the second clamping plate are connected with a connecting portion, the first clamping plate and the second clamping plate are disposed on both sides of the connecting portion, a mounting space for installing the positioning clamp is formed between the first clamping plate and the second clamping plate, and the mounting slot is a part of the mounting space.

Preferably, the support and the tray adopt a detachable structure, the tray is provided with a socket, and the end of the first clamping plate and/or the second clamping plate remote from the connecting portion is inserted into the socket. The advantages of the detachable structure are that it reduces the difficulty of making the tray, there is more space for changing the design of the positioning clamp; moreover, the structure can better meet the personalized needs, and it is easier to standardize the design of the parts.

Preferably, the first clamping plate and the second clamping plate are inserted into the socket through compression and deformation in the direction of the mounting space. During the insertion process, the first clamping plate and the second clamping plate closely match with the inner wall of the socket under the action of their own elastic force, and the first clamping plate and the second clamping plate are deformed to make the distance between the upper and lower end faces of the mounting space smaller, and simultaneously make the inner diameter of the mounting slot smaller, so that the inner side face of the mounting slot clamps the damping rotation shaft to achieve suspension during rotation.

Preferably, the mounting slot is provided at the end close to the connecting portion.

Preferably, the distance between the inner walls of the mounting space connecting the mounting slot is smaller than the inner diameter of the mounting slot. This structural design can ensure that the damping rotation shaft enters the mounting slot against a certain resistance during the process of being installed in the mounting slot, and prevents the damping ration shaft from slipping in the mounting slot.

Preferably, the diameter of the damping rotation shaft is greater than or equal to the inner diameter of the mounting slot. This structure can ensure that a sufficiently large friction force is obtained to achieve suspension without the deformation force of the first clamping plate and the second clamping plate.

Preferably, the mounting slot communicates with a deformation slot. The function of the deformation slot is that when the mounting slot deforms under stress, the deformation force can be transferred to the deformation slot, thereby ensuring that there is no seizure between the mounting slot and the damping rotation shaft.

Preferably, the deformation slot is located on the side of the mounting slot close to the connecting portion.

Preferably, a non-slip portion is provided on the outer wall of the end of the first clamping plate or/and the second clamping plate remote from the connecting portion, and the non-slip portion integrates closely with the side surface of the socket. The non-slip portion can increase the friction force between the first clamping plate, the second clamping plate and the inner surface of the sockets, and ensure the insertion strength.

Preferably, the positioning clamp is an elastic part, and the positioning clamp further includes a positioning shaft, which is installed in the archwire slot of the positioning bracket. The positioning bracket can be rotated around the positioning shaft, and the positioning shaft is connected with the damping rotation shaft through the connecting rod. This structure can ensure that the positioning bracket can rotate around the positioning shaft, greatly increasing the freedom of the positioning bracket, and enabling the positioning bracket to better match the tooth surfaces of different conditions.

Preferably, the number of the positioning shafts is two, and the number of the connecting rods is two. The connecting rod is connected to the two ends of the positioning shaft. The connecting rod and the positioning shaft form an "L"-shaped clamping shaft, and the two positioning shafts are inserted at the two ends of the archwire slot respectively. The connecting rods clamp the positioning bracket between the connecting rods, and as the positioning clamp is an elastic part, the distance between the connecting rods can be adjusted through deformation, thus coping with the disadvantage that the bracket slips during installation to cause an inaccurate bracket bonding position when there is an error in the bracket size.

Preferably, two connecting rods are used for clamping the two ends of the archwire slot.

Preferably, the positioning clamp is an integrated structure, and the support is an integrated structure.

Preferably, a limiting block is provided on the positioning shaft, and the limiting block abuts against the two ends of the archwire slot. The limiting block crosses the archwire slot and abuts against the end face where the two ends of the archwire slot are located, or part of the positioning block abuts inside the ports at the two ends of the archwire slot.

As this invention adopts the above technical solution, it has significant technical effects: Among the six directions of positioning freedom of the bracket, only two directions of positioning freedom (that is, height and center line of the bracket) are creatively controlled, and the remaining four dimensions of positioning freedom adopt the floating design to allow the bottom surface of the bracket to be freely combined with the tooth surface, thereby achieving close bonding between the bottom surface of the bracket and the tooth surface. Moreover, the structure facilitates the installation and allows certain errors in the accuracy of 3D printing and the size of the bracket, with strong applicability.

In addition, during the use of the mounting rack of this invention, the positioning clamp and the bracket can be suspended at any position, which provides a doctor with great freedom of operation. In the bracket bonding process, as the operating space of the month is limited and the bracket is small and difficult to control, the operation is extremely difficult during the glue application and bracket bonding, and the operation time is relatively long. With the technical solution of this invention, the doctor can suspend the bracket at a convenient position to apply glue according to the actual situation, which greatly improves the work efficiency, and the installation is more accurate.

The names of the parts indicated by the numbers in the figures are as follows: 1—Tray, 2—Mounting rack, 3—Bracket, 4—Support, 5—Positioning clamp, 6—Damping rotation shaft, 7—Mounting slot, 8—The first clamping plate, 9—The second clamping plate, 10—Mounting space, 11—Connecting portion, 12—Socket, 13—Non-slip portion, 14—Positioning shaft, 15—Connecting rod, 16—Limiting block, 17—Archwire slot 18—Deformation slot.

DETAILED DESCRIPTION OF THE EMBODIMENTS

This invention is described in further detail below with reference to the drawings and embodiments. An important point of this solution is to achieve the suspension of the positioning clamp 5 with the friction force.

Embodiment 1

As shown in FIGS. 1-6, it is a mounting device for directly bonding brackets to the tooth surface, including a tray 1 and a mounting rack 2, each mounting rack 2 is used for mounting a bracket 3, and the mounting rack 2 includes a support 4 and a positioning clamp 5;

The tray 1, which is used as the support base for installing the mounting rack 2;

The support 4, which is used as the fixed supporting part, with one end connected and fixed to the lingual or lip side of the tray 1;

The positioning clamp 5, which is used as the rotating part to connect with the bracket 3 and adjust the position of the bracket 3;

The positioning clamp 5 includes a damping rotation shaft 6, the damping rotation shaft 6 matches with the support 4, the positioning clamp 5 rotates around the support 4 through the damping rotation shaft 6, the diameter range of the damping rotation shaft 6 is 0.6 mm, and the support 4 and the tray 1 adopt an integrally formed structure or detachable structure. The definition source of the damping rotation shaft 6 is that in the process of installation of the bracket 3, the damping rotation shaft 6 is subject to frictional resistance during rotation and adjustment to achieve the suspension of the support 4.

Figure 2:
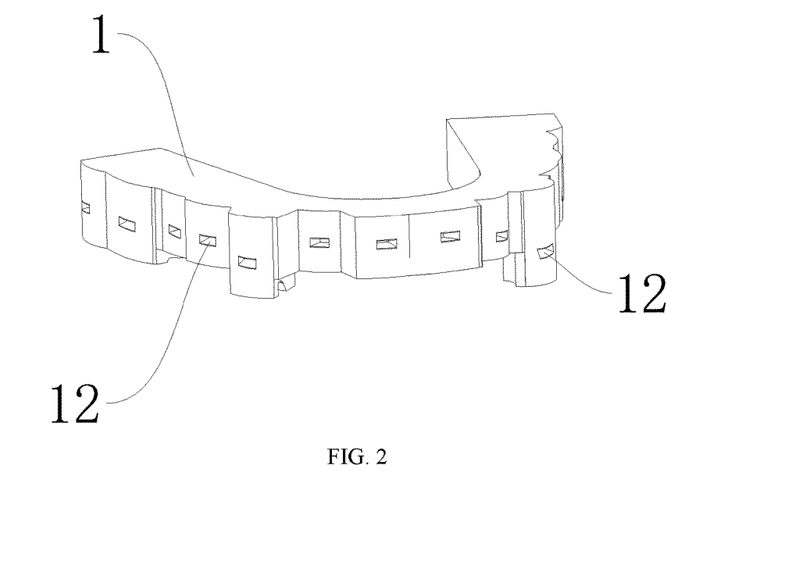
FIG. 2 is a structural diagram of the tray.
Figure 3:
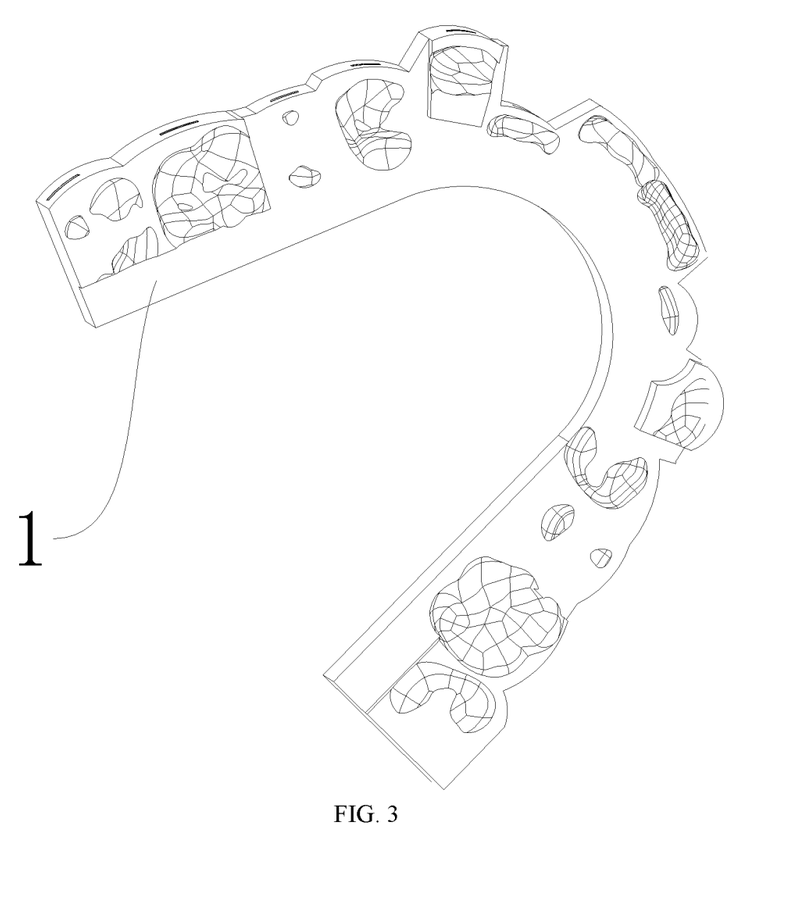
FIG. 3 is a bottom view of FIG. 2.

In order to facilitate understanding, this embodiment describes the formation process of the tray 1. Use professional orthodontic software such as RS-ORTH to automatically separate and arrange the teeth of the digital dental mold (e-Mold), determine the position of the bracket 3 and the tooth surface according to the diagnostic design plan, generate the tray 1 according to the installation position of the bracket 3 and the shape of the teeth, then design the position and angle of the socket on the digital dental mold according to the size of the mounting rack 2 and the installation position of the bracket 3 on the tooth surface, and finally use the 3D printing technology to print the tray 1. When the mounting rack 2 is mounted on the socket, the bracket 3 can be properly bonded to the tooth surface.

In this embodiment, the shape of the socket 12 is rectangular. The socket 12 is basically parallel to the archwire slot 17, specifically, one center line of the socket 12 is parallel to one center line of the archwire slot 17 of the bracket 3, and another center line of the socket 12 coincides with another center line of the archwire slot 17 or their orthographic projections on the tooth surface coincide with each other, thus ensuring that the bracket 3 will not be inclined when it is installed on the tooth surface, and the center line of the mounting bracket 2 coincides with the center line of the bracket 3 and the bracket 3 will not deflect to the left or right.

Figure 5:
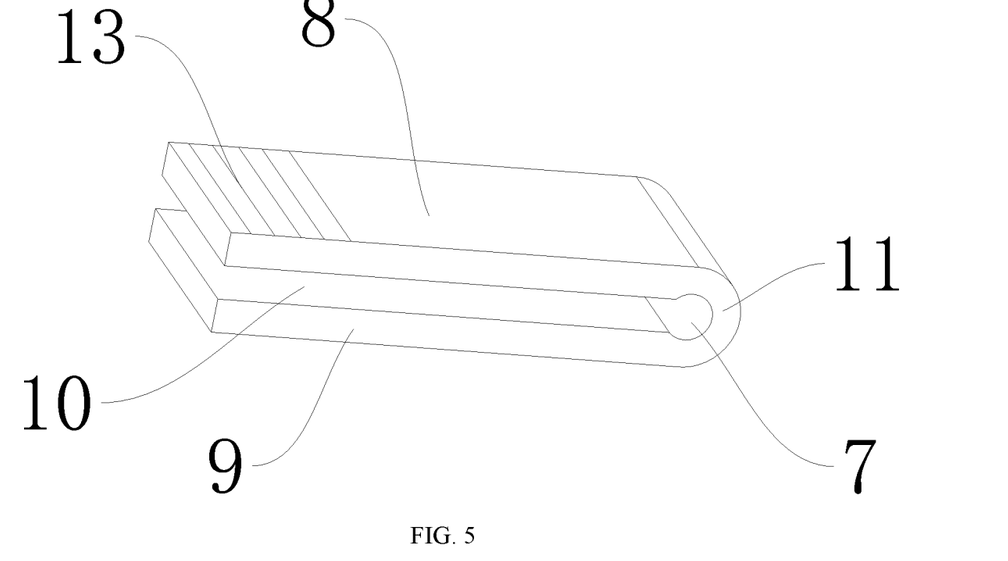
FIG. 5 is a structural diagram of the support.

The support 4 is provided with a mounting slot 7 matching the rotation shaft, and the damping rotation shaft 6 can rotate in the mounting slot 7. When the support 4 is mounted on the tray 1, the outer wall of the damping rotation shaft 6 closely matches with the inner wall of the mounting slot 7 in whole or in part. When the damping rotation shaft 6 is rotated, the positioning clamp 5 can suspend at the position to which the damping rotation shaft rotates. The mounting slot 7 in this embodiment is a through slot, and the damping rotation shaft 6 penetrates the mounting slot 7. During operation, as the inner wall of the mounting slot 7 and the outer wall of the damping rotating shaft 6 are in close contact, there is a large friction force between them, and the friction resistance can withstand the gravity of the positioning clamp 5 and the bracket 3 during suspension, thus achieving the suspension of the positioning clamp 5 and the bracket 3.

In this embodiment, the support 4 is an elastic part with deformation recovery ability. The support 4 includes a first clamping plate 8 and a second clamping plate 9. The ends of the first clamping plate 8 and the second clamping plate 9 are connected with a connecting portion 11, the first clamping plate 8 and the second clamping plate 9 are disposed on both sides of the connecting portion 11, a mounting space 10 for installing the positioning clamp 5 is formed between the first clamping plate 8 and the second clamping plate 9, and the mounting slot 7 is a part of the mounting space 10. The damping rotation shaft 6 gets into the mounting slot 7 from the end remote from the connecting portion 11 through the mounting space 10; the end of the first clamping plate 8 and/or the second clamping plate 9 remote from the connecting portion 11 is inserted into the socket 12. In this embodiment, both the first clamping plate 8 and the second clamping plate 9 are designed to be inserted into the socket 12.

In this embodiment, the first clamping plate 8 and the second clamping plate 9 are inserted into the socket 12 through compression and deformation in the direction of the mounting space 10. After the insertion, the distance between the inner walls of the mounting space of the support 4 becomes smaller, and the inner diameter of the mounting slot 7 also becomes smaller, so the mounting slot 7 can apply sufficient friction to the damping rotation shaft 6 to ensure its suspension. The first clamping plate 8 and the second clamping plate 9 are inserted into the socket 12 and cannot rotate, so it is convenient to determine that the center line of the support 4 coincides with the center line of the bracket 3 and ensure the accuracy of the installation. In this embodiment, the shape of the socket 12 is rectangular.

Figure 6:
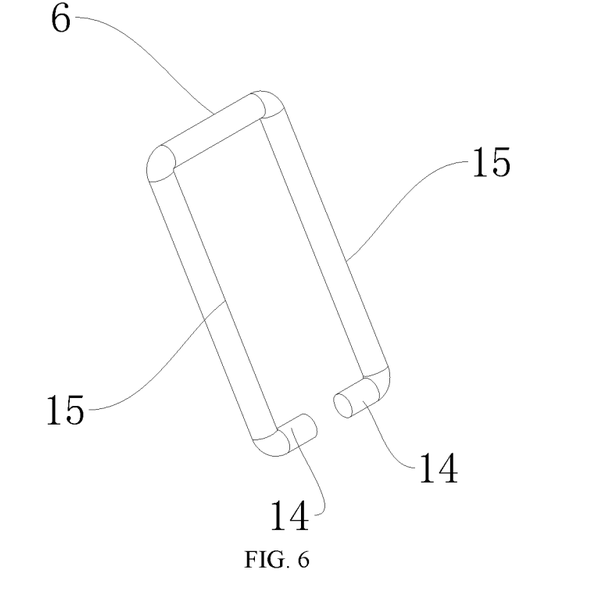
FIG. 6 is a structural diagram of the positioning clamp.
Figure 7:
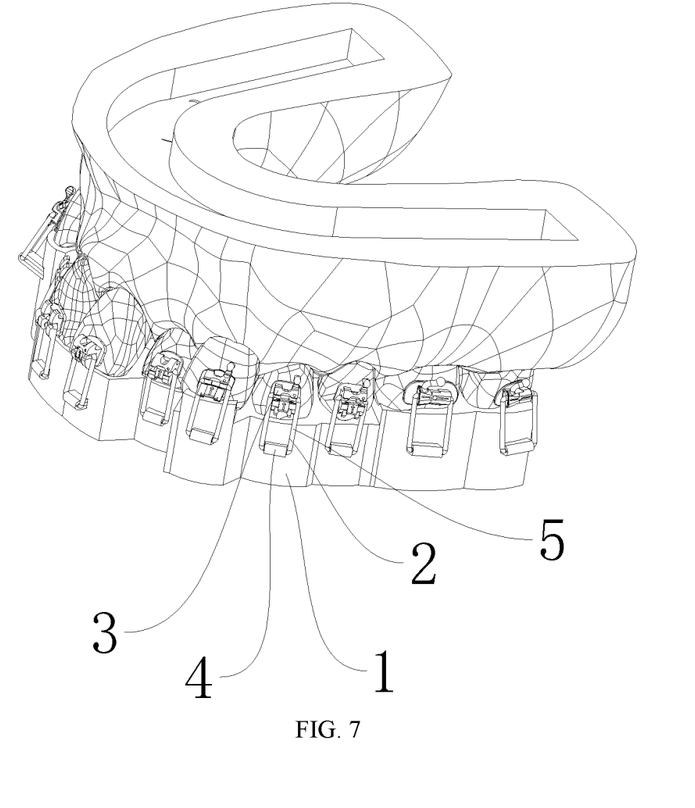
FIG. 7 is an assembly diagram of the support with a deformation slot and teeth.
Figure 8:
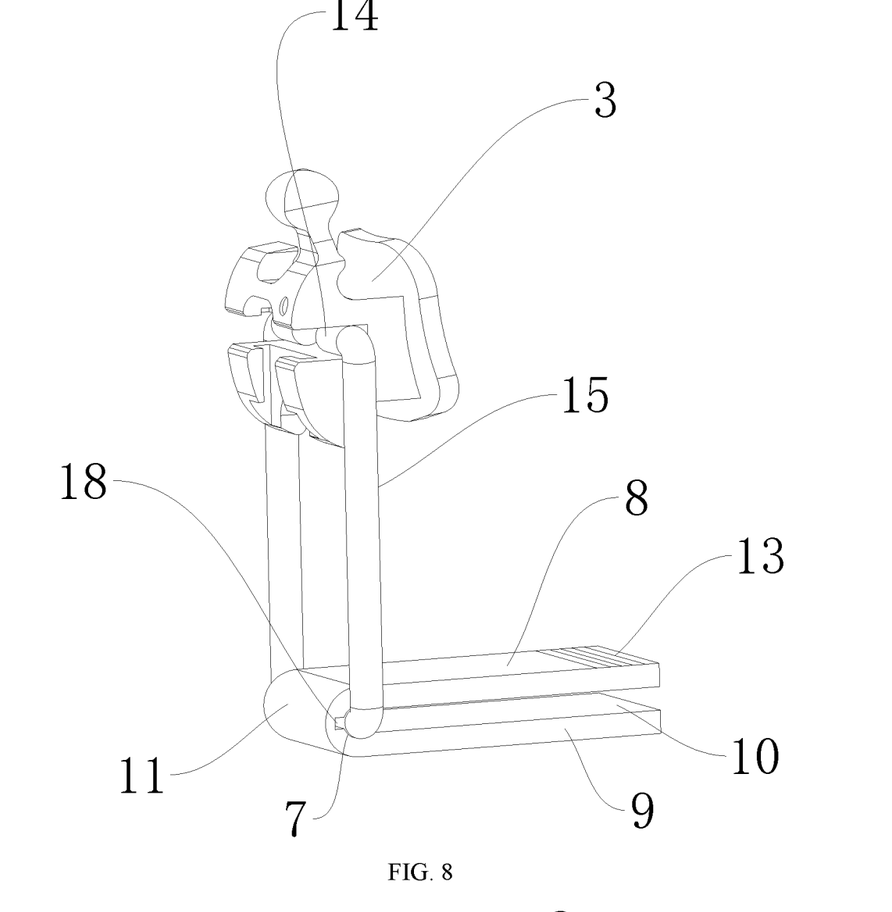
FIG. 8 is an assembly diagram of the mounting rack with a deformation slot and the bracket.
Figure 9:
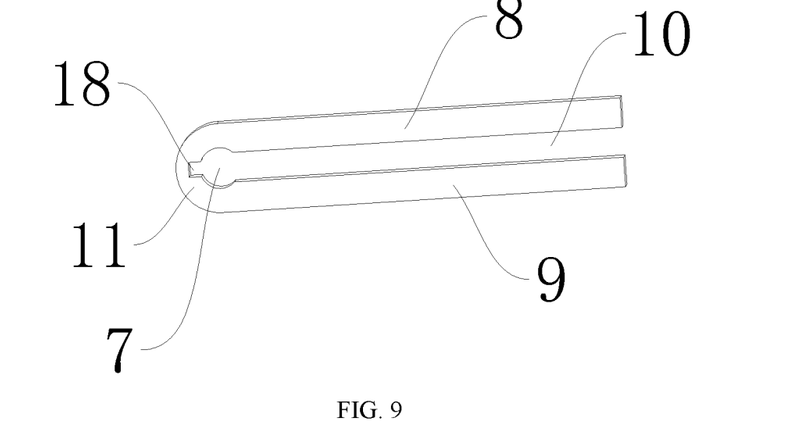
FIG. 9 is a structural diagram of the support with a deformation slot.

When the positioning clamp 5 is installed, the damping rotation shaft 6 of the positioning clamp 5 enters the mounting space 10 of the support 4 of the first clamping plate 8 and the second clamping plate 9 from the end remote from the connecting portion 11, then slides toward one end of the connecting portion 11 and finally falls inside the mounting slot 7. In this embodiment, the mounting slot 7 is provided at the end close to the connecting portion 11.

In this embodiment, when the support 4 is not inserted into the tray 1 in the initial state of the mounting slot 7, the size of the mounting slot 7 is equal to or slightly larger than the outer diameter of the damping rotation shaft 6. This structure facilitates the installation of the positioning clamp 5 in the mounting slot 7, because the size of the positioning clamp 5 and the support 4 is relatively small, and it is not convenient to assemble the support 4 and the positioning clamp 5 if the resistance is too large. The structure in this embodiment satisfies that after the first clamping plate 8 and the second clamping plate 9 are inserted into the socket, the deformation amount of the mounting slot 7 is sufficient to ensure that the mounting slot 7 clamps the damping rotation shaft 6. The distance between the inner walls of the mounting space 10 connecting the mounting slot 7 is smaller than the inner diameter of the mounting slot 7. The mounting space 10 connecting the mounting slot 7 is the part of the mounting slot 7 remote from the connecting portion 11. This structural design can ensure that the damping rotation shaft 6 overcomes a certain resistance and enters the mounting slot 7 during the process of being installed into the mounting slot 7, and prevent the damping shaft 6 from slipping in the mounting slot 7.

In this embodiment, the support 4 is not inserted into the tray 1 in the initial state, and the distance between the inner walls of the mounting space on one side of the mounting slot 7 remote from the connecting portion 11 is slightly larger than the size of the damping rotation shaft 6, thereby facilitating the assembly of the damping rotation shaft 6 inside the mounting slot 7.

In this embodiment, the positioning clamp 5 is an elastic part, and the positioning clamp 5 further includes a positioning shaft 14, and the positioning shaft 14 is installed in the archwire slot 17 of the positioning bracket 3. The positioning bracket 3 can be rotated around the positioning shaft 14, and the positioning shaft 14 is connected with the damping rotation shaft 6 through the connecting rod 15. This structure can ensure that the positioning bracket 3 can rotate around the positioning shaft 14, greatly increasing the freedom of the positioning bracket 3, and enabling the positioning bracket 3 to better match the tooth surfaces of different conditions.

Figure 4:
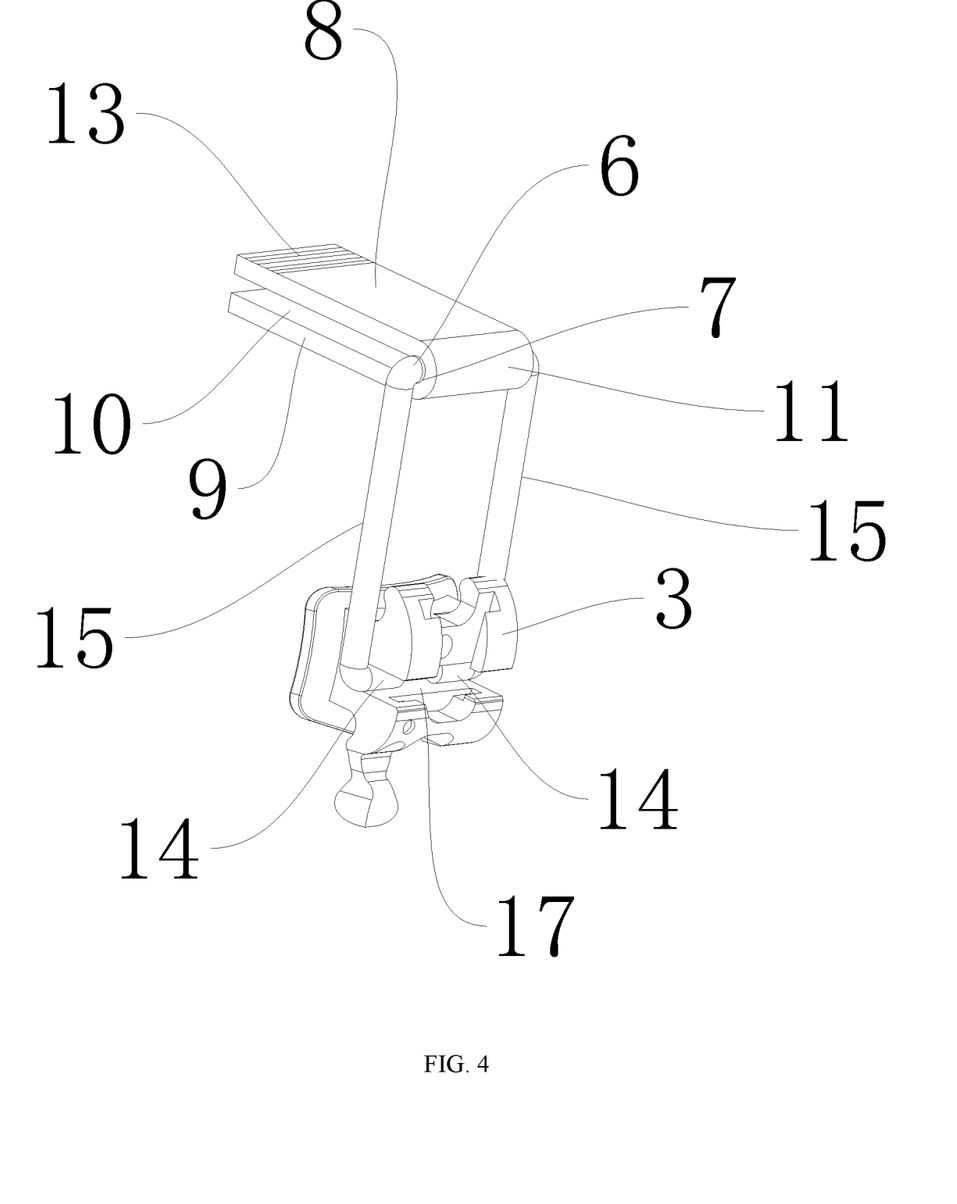
FIG. 4 is an assembly diagram of the mounting rack and the bracket.

Specifically, in this embodiment, the number of the positioning shafts 14 is two, and the number of the connecting rods 15 is two. The positioning shaft 14, damping rotation shaft 14 and connecting rod 15 have an integrally formed structure; the connecting rod 15 is connected to the two ends of the damping rotation shaft 6, each connecting rod 15 and each positioning shaft 14 form an "L"-shaped clamping shaft, the two positioning shafts 14 are inserted at the two ends of the archwire slot 17 respectively, the bracket 3 is clamped between the two connecting rods 15, and the distance between the two connecting rods 15 can be increased under external force to adapt to the brackets 3 of different sizes, because the brackets 3 generally have different sizes on different tooth surfaces. In addition, in the process of deformation of the connecting rod 15 of this structure, its center line will not change, so that the alignment of the bracket 3 can be accurately ensured. The length of the connecting rod 15 and the position of the socket 12 determine the installation height of the bracket 3, and the center line position of the positioning clamp 5 determines the degree of alignment of the bracket 3.

Figure 1:
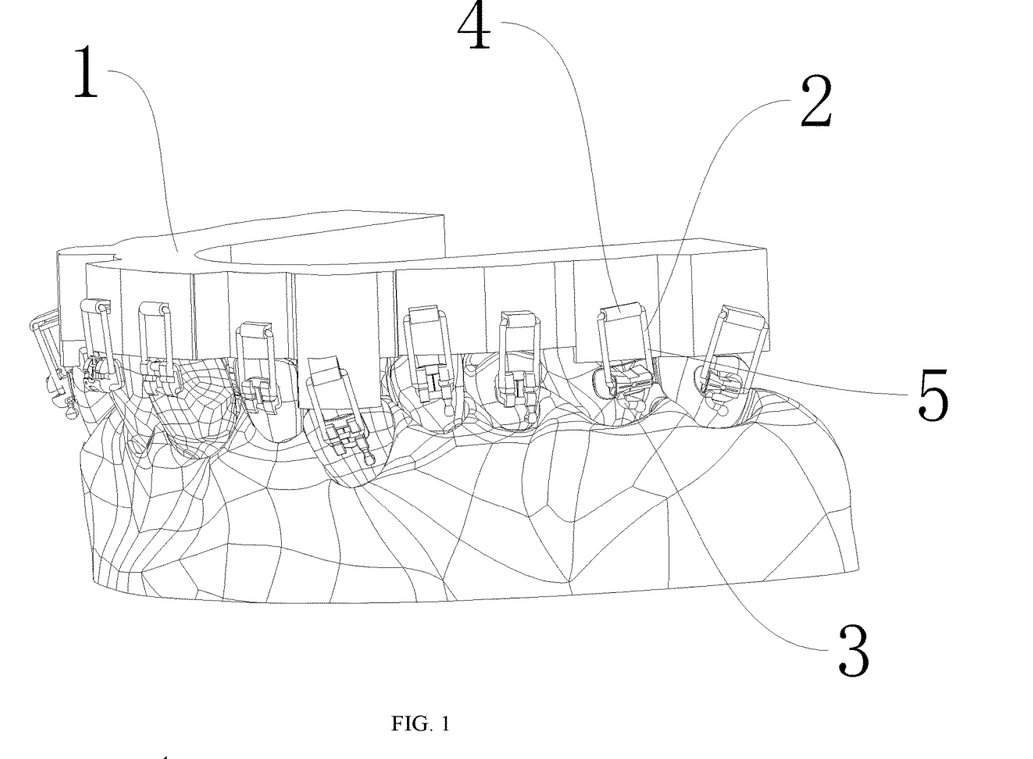
FIG. 1 is an assembly diagram of the mounting device and teeth according to Embodiment 1.

The use process of this device is as follows. The clinic imports the 3D dental molds, and the orthodontic software company uses the software to design the 3D model of the tray 13, and transmits the 3D file of the tray 1 to the clinic. The clinic 3D prints the tray 1 according to the 3D printing file, and then inserts the positioning shaft 14 of the positioning clamp 5 into the archwire slot 17. The clamping force between the connecting rods 15 clamps the bracket 3 between the connecting rods 15, ensuring that the bracket 3 can rotate and suspend at any position. Then the assembled mounting device with the bracket 3 is installed into the socket 12 on the tray 1 according to the tooth position corresponding to the bracket 3, then the user engages the tray 1, and the operator rotates the positioning clamp 5 and the bracket 3 to make the bracket 3 suspend in a suitable position, then applies glue to the bracket 3, and push the bracket 3 to make the bracket 3 and the tooth surface integrate completely, wherein the friction force generated between the damping rotation shaft 6 and the mounting slot 7 can generate pressure between the bonding surface of the bracket 3 and the tooth surface, so that they integrate closely to improve the bonding accuracy. Then, bond the bracket 3 through light curing, rotate the positioning clamp 5 to disengage the positioning shaft 14 from the archwire slot 17, and then take out the tray to complete the bonding. The device is suitable for lip-side bonding of the bracket 3 and also for lingual-side bonding of the bracket 3. When lip-side bonding is required, the socket 12 is opened on the outside of the tray 1. When lingual-side bonding is required, the socket 12 is opened on the inside of the tray 1. The bracket 3 in this embodiment is a self-locking bracket 3, and the bracket 3 can also adopt other structures.

The following table is the comparison table of costs and working hours:

| Bonding method | Indirect | Direct | Cost (RMB) | Clinical operation | Clinical time | Degree of accuracy | Production method | Production time |
|---|---|---|---|---|---|---|---|---|
| Visual inspection by the doctor | | ✓ | Doctor's cost | Simple | 60 minutes | Low | Direct bonding inside the mouth | — |
| Support type | ✓ | | 850 | In segments/highly difficult | 20 minutes | High | Factory | 7-10 days |
| Suction film type | ✓ | | 500 | High separation rate | 30 minutes | Low | Clinic technician/factory | 3-5 days |
| 3D printing Wrapping type | | ✓ | 200 | In segments/highly difficult | 30 minutes | Low | Clinic technician/factory | 3 hours |
| This invention | | ✓ | 400 | No need for segmentation/easy operation | 15 minutes | High | Clinic assistant or nurse | 3 hours |

This technical solution has the advantages of high bonding accuracy, short bonding time, and low requirements for operators.

Embodiment 2

As shown in FIGS. 1-6, it is a mounting device for directly bonding brackets to the tooth surface. In addition to the technical solution of Embodiment 1, this embodiment also includes the following supplementary technical solution: The distance between the inner walls of the mounting space 10 connecting the mounting slot 7 is smaller than the inner diameter of the mounting slot 7. The mounting space 10 connecting the mounting slot 7 is the part of the mounting slot 7 remote from the connecting portion 11. This structural design can ensure that the damping rotation shaft 6 overcomes a certain resistance and enters the mounting slot 7 during the process of being installed into the mounting slot 7, and prevent the damping shaft 6 from slipping in the mounting slot 7. In this embodiment, the specific implementation method of the structure is that an arc-shaped slot is provided on the side adjacent to the first clamping plate 8 and the second clamping plate 9, so that the distance between the two arc-shaped slots is greater than the distance between the inner walls of the adjacent mounting space 10.

Embodiment 3

As shown in FIGS. 1-9, it is a mounting device for directly bonding brackets to the tooth surface. In addition to the technical solution of Embodiment 2, this embodiment also includes the following supplementary technical solution: The mounting slot 11 communicates with a deformation slot 18 at the end close to the connecting portion 11. The function of the deformation slot 18 is that when the mounting slot 7 deforms under stress, the deformation force can be transferred to the deformation slot 18 to facilitate the deformation of the mounting slot 7; meanwhile, it can avoid seizure between the mounting slot 7 and the damping rotation shaft 6 due to excessive friction force between the mounting slot 7 and the damping rotation shaft 6.

Embodiment 4

As shown in FIGS. 1-6, it is a mounting device for directly bonding brackets to the tooth surface. In addition to the technical solution of Embodiment 1, this embodiment also includes the following supplementary technical solution: The support 4 has an integrally formed structure. The first clamping plate 8, the second clamping plate 9, and the connecting portion 11 are formed by bending a plate. The distance between the first clamping plate 8 and the second clamping plate 9 gradually increases from the connecting portion 11 to the other end. A mounting slot 7 is formed at the bend. The inner diameter of the mounting slot 7 is equal to or slightly smaller than the outer diameter of the damping rotation shaft 6.

Embodiment 5

As shown in FIGS. 1-6, it is a mounting device for directly bonding brackets to the tooth surface. In addition to the technical solution of Embodiment 1, this embodiment also includes the following supplementary technical solution: The inner surface of the mounting slot 7 is an unsmooth surface, so that the friction force with the damping rotation shaft 6 can be increased. This supplementary technical solution is also applicable to Embodiment 2, Embodiment 3, and Embodiment 4.

Embodiment 6

As shown in FIGS. 1-6, it is a mounting device for directly bonding brackets to the tooth surface. This embodiment differs from Embodiment 1 in that: In this embodiment, when the support 4 is not inserted into the tray 1 in the initial state of the mounting slot 7, the size of the mounting slot 7 is less than or equal to the outer diameter of the damping rotation shaft 6. This structure can ensure that the positioning clamp 5 can achieve suspension whether the support 4 is mounted to the socket 12 or not, and the clamping force of the mounting slot 7 against the damping rotation shaft 6 is greater after the support 4 is installed. This supplementary technical solution is also applicable to Embodiment 2, Embodiment 3, Embodiment 4, and Embodiment 5.

Embodiment 7

It is a mounting device for directly bonding brackets to the tooth surface. This embodiment differs from Embodiment 1 in that: In this embodiment, only the first clamping plate 8 or the second clamping plate 9 is inserted into the socket 12, and the other clamping plate only surrounds to form the mounting slot 7. In this structure, in the initial state of the mounting slot 7 when the support 4 is not inserted into the tray 1, the size of the mounting slot 7 is less than or equal to the outer diameter of the damping rotation shaft 6, and the size of the mounting slot 7 will not be affected after the first clamping plate 8 or the second clamping plate 9 is inserted into the socket 12. This structure can also achieve suspension of the positioning clamp 5 and the bracket 3. This supplementary technical solution is also applicable to Embodiment 2, Embodiment 3, Embodiment 4, Embodiment 5, and Embodiment 6.

Embodiment 8

It is a mounting device for directly bonding brackets to the tooth surface. This embodiment differs from Embodiment 1 in that: The support 4 and the tray 1 adopt an integrally formed structure. The first clamping plate 8 and the second clamping plate 9 are integrally formed on the tray 1. In this embodiment, only the first clamping plate 8 or the second clamping plate 9 is integrally formed on the tray 1, and the other clamping plate only surrounds to form the mounting slot 7. In this structure, in the initial state of the mounting slot 7 when the support 4 is not inserted into the tray 1, the size of the mounting slot 7 is less than or equal to the outer diameter of the damping rotation shaft 6, and the size of the mounting slot 7 will not be affected after the first clamping plate 8 or the second clamping plate 9 is inserted into the socket 12. This structure can also achieve suspension of the positioning clamp 5 and the bracket 3.

Embodiment 9

Figure 10:
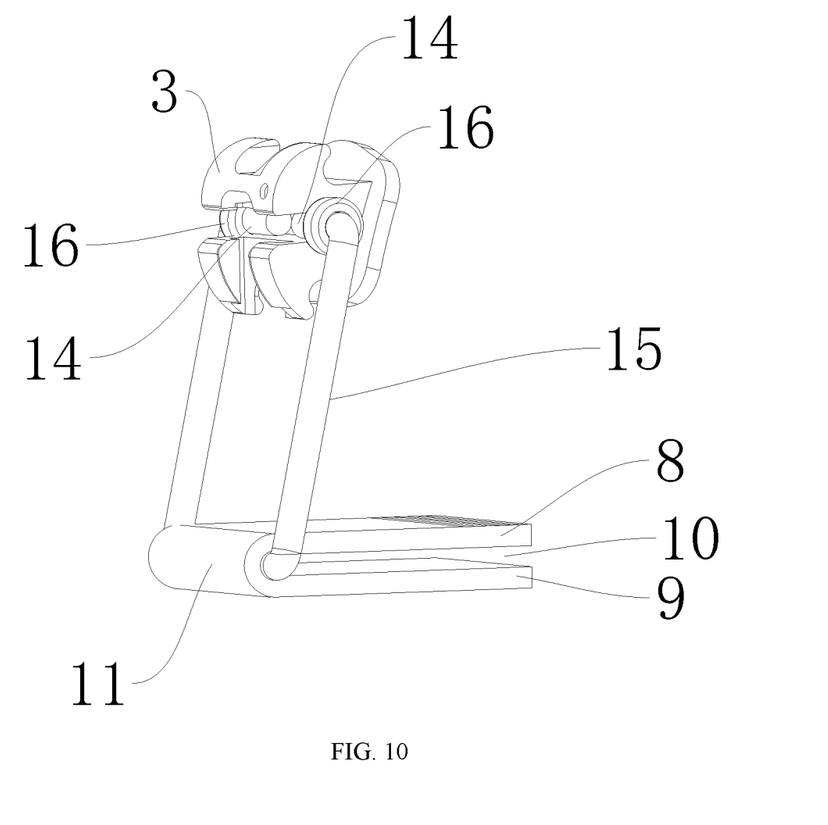
FIG. 10 is an assembly diagram of the mounting rack with a limiting block and the bracket.
Figure 11:
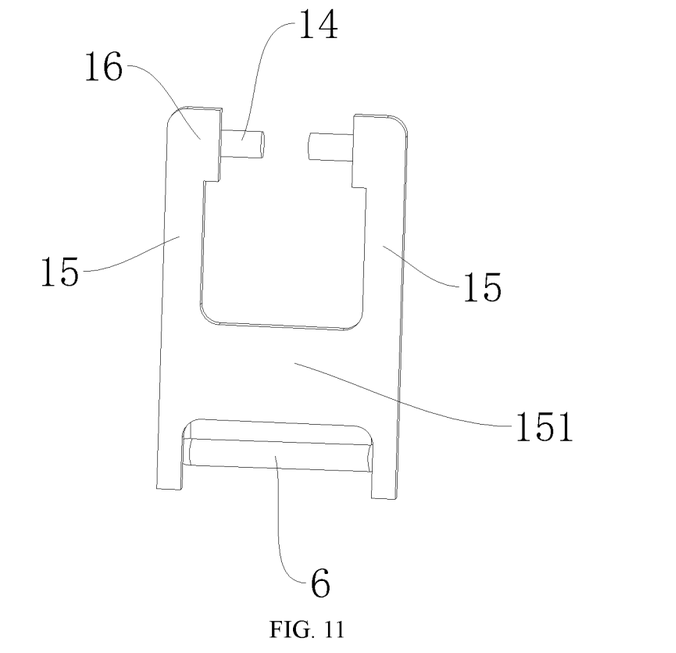
FIG. 11 is another form of the limiting block, and the connecting rods are connected with a connecting arm.
Figure 12:
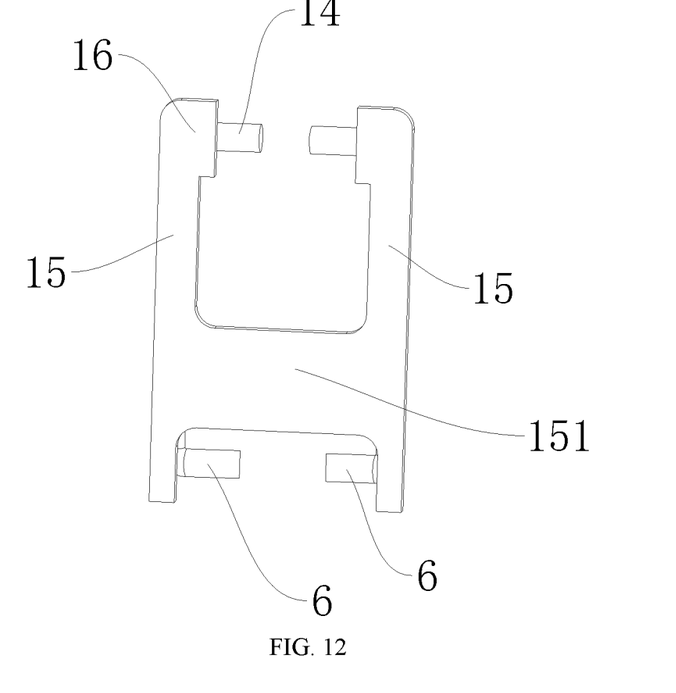
FIG. 12 is an extension of FIG. 11, and the damping rotation shaft is replaced by two rotation shaft sections.
Figure 13:
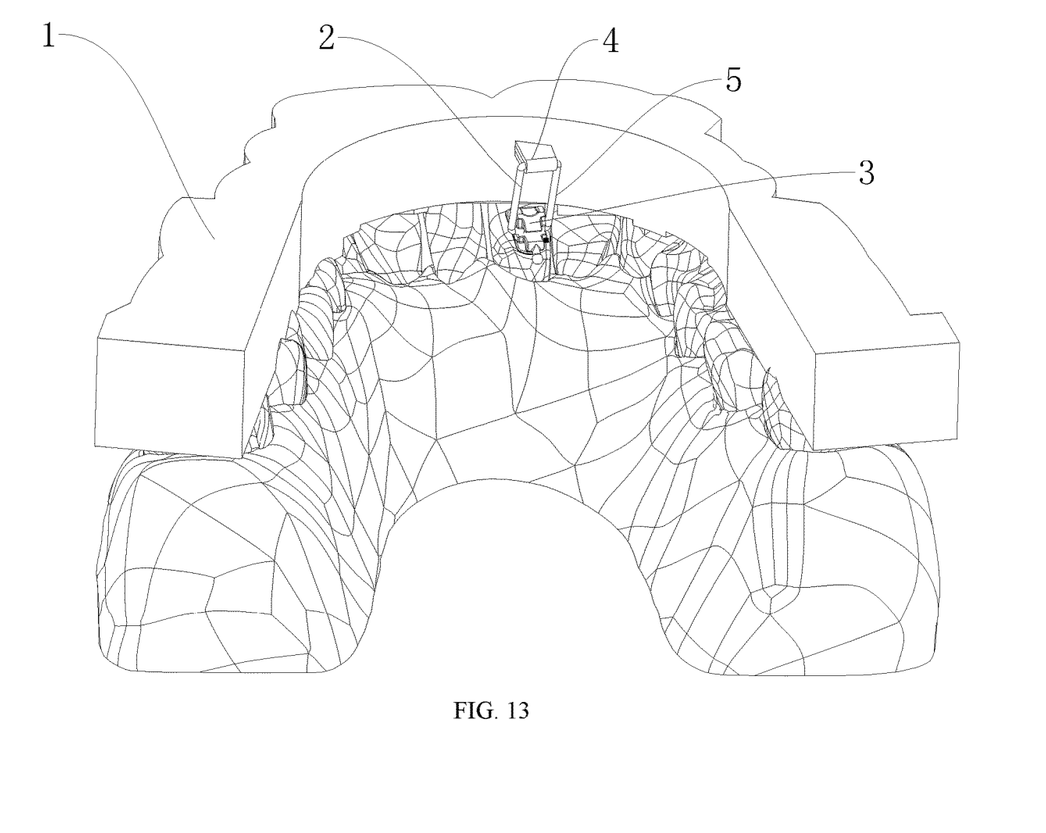
FIG. 13 is a structural diagram of installation on the lingual side.

As shown in FIGS. 10-12, it is a mounting device for directly bonding brackets to the tooth surface. In addition to the technical solution of Embodiment 1, this embodiment also includes the following supplementary technical solution: The positioning shaft 14 is provided with a limiting block 16, which abuts against the side faces at the two ends of the archwire slot 17 of the bracket 3. The limiting block 16 crosses the archwire slot 17, so that the positioning clamp 5 and the archwire slot 17 achieve surface contact with each other, the positioning is more reliable, the alignment of the bracket 3 is ensured without left-right slip, and the rotation around the positioning shaft 14 is more smooth. The supplementary technical solution of this embodiment is also applicable to Embodiment 2, Embodiment 3, Embodiment 4, Embodiment 5, Embodiment 6, Embodiment 7, and Embodiment 8.

Embodiment 10

It is a mounting device for directly bonding brackets to the tooth surface. In addition to the technical solution of Embodiment 9, this embodiment also includes the following supplementary technical solution: The limiting block 16 is a cylinder or rectangular parallelepiped.

Embodiment 11

It is a mounting device for directly bonding brackets to the tooth surface. In addition to the technical solution of Embodiment 9, this embodiment also includes the following supplementary technical solution: Part of the positioning block 16 abuts inside the ports at the two ends of the archwire slot 17, so as to limit the left-right slip of the archwire slot 17 without affecting the rotation of the bracket 3 around the archwire slot 17.

Embodiment 12

It is a mounting device for directly bonding brackets to the tooth surface. This embodiment differs from Embodiment 1 in that: The distance between the connecting rods 15 is less than or equal to the length of the archwire slot 17. In this case, the size of the positioning shaft 14 is designed, so that the positioning shaft 14 is clamped in the archwire slot 17, and there is a large friction force between the positioning shaft 14 and the inner walls of the wire slot 17 to ensure that the bracket 3 can achieve suspension to facilitate the application of glue. Of course, other methods can also be adopted to ensure the suspension of the bracket 3, and the suspension methods that those skilled in the art can think of shall fall within the protection scope of this invention.

Embodiment 13

As shown in FIGS. 1-6, it is a mounting device for directly bonding brackets to the tooth surface. In addition to the technical solution of Embodiment 1, this embodiment also includes the following supplementary technical solution: A non-slip portion 13 is provided on the outer wall of the end of the first clamping plate 8 or/and the second clamping plate 9 remote from the connecting portion 11. The purpose of the non-slip portion 13 is to increase the friction force between the first clamping plate 8, the second clamping plate 9 and the socket 12, making the insertion between the first clamping plate 8, the second clamping plate 9 and the socket 12 more reliable.

Embodiment 14

It is a mounting device for directly bonding brackets to the tooth surface. This embodiment differs from Embodiment 1 in that: The cross section of the socket 12 is oval.

Embodiment 15

It is a mounting device for directly bonding brackets to the tooth surface. This embodiment differs from Embodiment 1 in that: A connecting arm 151 is also connected between the connecting rods 15. The damping rotation shaft 6 is designed with two shaft sections, and the two shaft sections are respectively inserted into two ends of the mounting slot 7. This structure is applicable to any one of the said embodiments.

Embodiment 16

It is a mounting device for directly bonding brackets to the tooth surface. This embodiment differs from Embodiment 1 in that: The diameter of the damping rotation shaft 6 is 1 mm.

Embodiment 17

It is a mounting device for directly bonding brackets to the tooth surface. This embodiment differs from Embodiment 1 in that: The diameter of the damping rotation shaft 6 is 0.2 mm.

Embodiment 18

It is a mounting device for directly bonding brackets to the tooth surface. This embodiment differs from Embodiment 1 in that: The diameter of the damping rotation shaft 6 is 5 mm. In short, the above embodiments are only preferred ones of this invention, and any equivalent changes and modifications made in accordance with the scope of the patent application of this invention shall fall within the scope of this invention patent.

What is claimed is:

1. A mounting device for directly bonding brackets to a tooth surface, comprising a tray and a plurality of mounting racks, each mounting rack of the plurality of mounting racks is configured for mounting a bracket of the brackets, and the each mounting rack comprises a support and a positioning clamp;
   the tray is configured as a support base for installing the plurality of mounting racks;
   the support is configured as a fixed supporting part, one end of the support is connected and fixed to a lingual or lip side of the tray;
   the positioning clamp is configured as a rotating part to connect to the bracket and adjust a position of the bracket;
   the positioning clamp comprises a damping rotation shaft, the positioning clamp rotates around the support through the damping rotation shaft, a range for a diameter of the damping rotation shaft is 0.2 mm-5 mm, and the support and the tray adopt an integrally formed structure or a detachable structure;
   wherein the damping rotation shaft of the positioning clamp is inserted into a mounting slot of the support, the damping rotation shaft rotates in the mounting slot, an outer wall of the damping rotation shaft comes into contact with an inner wall of the mounting slot in whole or in part, when the damping rotation shaft is rotated, the damping rotation shaft is subject to frictional resistance to achieve a suspension of the positioning clamp;
   wherein the support is an elastic part with a deformation recovery ability, and the support comprises a first clamping plate, a second clamping plate, and a connecting portion; a first end of the first clamping plate and a first end of the second clamping plate are connected by the connecting portion, the first end of the first clamping plate is disposed on a first side of the connecting portion and the first end of the second clamping plate is disposed on a second side of the connecting portion, a mounting space for installing the positioning clamp is formed between the first clamping plate and the second clamping plate, and the mounting slot is a through slot part of the mounting space formed by the connecting portion.

2. The mounting device for directly bonding the brackets to the tooth surface according to claim 1, wherein the support and the tray adopt the detachable structure, the tray comprises a socket, and a second end of the first clamping plate and a second end of the second clamping plate are inserted into the socket, the second end of the first clamping plate and the second end of the second clamping plate are remote from the connecting portion; and the first clamping plate and the second clamping plate inserted into the socket do not rotate.

3. The mounting device for directly bonding the brackets to the tooth surface according to claim 2, wherein the first clamping plate and the second clamping plate are inserted into the socket through a compression and a deformation in a direction of the mounting space.

4. The mounting device for directly bonding the brackets to the tooth surface according to claim 1, wherein a distance between the first clamping plate and the second clamping plate is smaller than an inner diameter of the mounting slot.

5. The mounting device for directly bonding the brackets to the tooth surface according to claim 1, wherein the diameter of the damping rotation shaft is greater than or equal to an inner diameter of the mounting slot.

6. The mounting device for directly bonding the brackets to the tooth surface according to claim 1, wherein the mounting slot communicates with a deformation slot.

7. The mounting device for directly bonding the brackets to the tooth surface according to claim 2, wherein
   a first non-slip portion is provided on an outer wall of the second end of the first clamping plate, and a second non-slip portion is provided on an outer wall of the second end of the second clamping plate, and
   each of the first non-slip portion and the second non-slip portion integrates with a side surface of the socket.

8. The mounting device for directly bonding the brackets to the tooth surface according to claim 2, wherein a cross section of the socket is non-circular, the socket is configured to be parallel to an archwire slot of the bracket, and a center line of the socket j configured to coincide with a center line of the archwire slot, or an orthographic projection of the center line of the socket on the tooth surface is configured to coincide with an orthographic projection of the center line of the archwire slot on the tooth surface.

9. A mounting device for directly bonding brackets to a tooth surface, comprising a tray and a plurality of mounting racks, each mounting rack of the plurality of mounting racks is configured for mounting a bracket of the brackets, and the each mounting rack comprises a support and a positioning clamp; the tray is configured as a support base for installing the plurality of mounting racks; the support is configured as a fixed supporting part, one end of the support is connected and fixed to a lingual or lip side of the tray; the positioning clamp is configured as a rotating part to connect with the bracket and adjust a position of the bracket; the positioning clamp comprises a damping rotation shaft, two positioning shafts, and two connecting rods, the damping rotation shaft is inserted into the support, the positioning clamp rotates around the support through the damping rotation shaft, a range for a diameter of the damping rotation shaft is 0.2 mm-5 mm, and the support and the tray adopt an integrally formed structure or a detachable structure; wherein the positioning clamp is an elastic part with a deformation recovery ability, and the two positioning shafts are connected to two ends of the damping rotation shaft by the two connecting rods wherein at distal ends of the two connecting rods away from the damping rotation shaft, the two connecting rods and the two positioning shafts form two "L"-shaped clamping shafts, and the two positioning shafts are configured to be respectively inserted at two ends of an archwire slot of the bracket so that the bracket rotates around the two positioning shafts.

10. The mounting device for directly bonding the brackets to the tooth surface according to claim 9, wherein
    the positioning clamp further comprises a connecting arm between the two connecting rods, and
    the connecting arm is formed in a space between the damping rotation shaft and the two positioning shafts.

11. The mounting device for directly bonding the brackets to the tooth surface according to claim 9, wherein a distance between the two connecting rods is configured to be less than or equal to a length of the archwire slot.

12. The mounting device for directly bonding the brackets to the tooth surface according to claim 9, wherein two limiting blocks are respectively provided on the two positioning shafts, and the two limiting blocks are configured to abut against the two ends of the archwire slot, the two limiting blocks abut against end surfaces of the two positioning shafts, the two ends of the archwire slot are located on the end surfaces, or part of the two limiting blocks are configured to abut an inside of ports at the two ends of the archwire slot.

* * * * *